United States Patent
Walch et al.

(10) Patent No.: US 6,269,619 B1
(45) Date of Patent: Aug. 7, 2001

(54) MOWER WITH A CENTRALIZED DEVICE FOR ADJUSTING THE LIGHTENING FORCE EXERTED ON THE HARVESTING MECHANISM

(75) Inventors: Martin Walch, Dettwiller; Bernard Wattron, Haegen, both of (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/457,343

(22) Filed: Dec. 8, 1999

(30) Foreign Application Priority Data

Dec. 14, 1998 (FR) .................................................. 98 15910

(51) Int. Cl.$^7$ ..................................................... A01D 34/03
(52) U.S. Cl. ................................. 56/14.9; 56/15.7; 56/15.2
(58) Field of Search ..................................... 56/14.9, 15.7, 56/15.8, 15.2, 16.7, 13.6, 6, 7, 8, 228, 208, DIG. 3, DIG. 10, DIG. 14, DIG. 17; 280/415.1; 172/240, 245

(56) References Cited

U.S. PATENT DOCUMENTS

| | | |
|---|---|---|
| 3,309,850 | 3/1967 | Glass et al. . |
| 4,081,946 | 4/1978 | Ehrhart . |
| 4,218,865 * | 8/1980 | Chaumont et al. ................... 56/13.6 |
| 4,610,128 | 9/1986 | Ermacora . |
| 4,669,256 | 6/1987 | Ermacora et al. . |
| 4,694,640 | 9/1987 | Ermacora et al. . |
| 4,714,123 | 12/1987 | Ermacora et al. . |
| 4,719,742 | 1/1988 | Ermacora et al. . |
| 4,720,964 | 1/1988 | Ermacora et al. . |
| 4,723,396 | 2/1988 | Ermacora . |
| 4,763,463 | 8/1988 | Ermacora et al. . |
| 4,771,591 | 9/1988 | Ermacora . |
| 4,811,553 | 3/1989 | Ermacora et al. . |
| 4,833,868 | 5/1989 | Ermacora et al. . |
| 4,838,013 * | 6/1989 | Louet Feisser et al. .............. 56/13.6 |
| 4,848,069 | 7/1989 | Ermacora et al. . |
| 4,947,629 | 8/1990 | Ermacora et al. . |
| 4,986,064 | 1/1991 | Ermacora . |
| 4,991,383 | 2/1991 | Ermacora . |
| 5,060,462 | 10/1991 | Helfer et al. . |
| 5,094,063 | 3/1992 | Wattron et al. . |
| 5,107,663 | 4/1992 | Wattron et al. . |
| 5,136,828 | 8/1992 | Ermacora . |
| 5,199,249 | 4/1993 | Wattron et al. . |

(List continued on next page.)

FOREIGN PATENT DOCUMENTS

| | | |
|---|---|---|
| 2 151 156 | 4/1973 | (DE) . |
| 2 110 911 | 6/1972 | (FR) . |
| 2 560 484 | 9/1985 | (FR) . |
| 2 608 362 | 6/1988 | (FR) . |

Primary Examiner—Robert E. Pezzuto
Assistant Examiner—Árpád Fàbiàn Kovács
(74) Attorney, Agent, or Firm—Oblon, Spivak, McClelland, Maier & Neustadt, P.C.

(57) ABSTRACT

Mower including a suspension device connecting a harvesting mechanism to a chassis and allowing the harvesting mechanism a heightwise movement with respect to the chassis. The mower further including a lightening device associated with the harvesting mechanism and including two elastically deformable members extending transversely to a direction of forward travel during work, each elastically deformable member acting, via a first of its ends, on a corresponding end of the harvesting mechanism. The mower including a centralized device for adjusting the lightening force exerted on the harvesting mechanism, where the device is coupled to the second ends of the elastically deformable members. The centralized device for adjusting the lightening force exerted on the harvesting mechanism includes a rotary control member connected to the chassis and coupled to each second end of the elastically deformable members via a configuration which converts the rotation of the rotary control member into an action of stressing or relaxing the elastically deformable members depending on the direction in which the rotary control member is turned.

26 Claims, 7 Drawing Sheets

U.S. PATENT DOCUMENTS

| | | |
|---|---|---|
| 5,199,250 | 4/1993 | Ermacora et al. . |
| 5,357,737 | 10/1994 | Ermacora et al. . |
| 5,417,042 | 5/1995 | Walch et al. . |
| 5,423,165 | 6/1995 | Walch et al. . |
| 5,507,136 | 4/1996 | Walch . |
| 5,522,208 | 6/1996 | Wattron . |
| 5,660,032 | 8/1997 | Neuerburg et al. . |
| 5,749,390 | 5/1998 | Ermacora et al. . |
| 5,794,424 | 8/1998 | Ermacora et al. . |
| 5,852,921 | 12/1998 | Neuerburg et al. . |
| 5,857,314 | 1/1999 | Wolff . |
| 5,901,533 | 5/1999 | Ermacora et al. . |
| 5,901,537 | 5/1999 | Walch et al. . |
| 5,966,913 | 10/1999 | Neuerburg . |
| 5,992,133 | 11/1999 | Walch et al. . |
| 6,055,800 * | 2/2000 | Walch .................................. 56/16.7 |

\* cited by examiner

MOWER WITH A CENTRALIZED DEVICE FOR ADJUSTING THE LIGHTENING FORCE EXERTED ON THE HARVESTING MECHANISM

BACKGROUND OF THE INVENTION

1. Field of the Invention

The present invention relates to a mower comprising:

a chassis, a connecting means allowing the said chassis to be connected to a motor vehicle, at least one harvesting mechanism equipped with cutting members, a suspension device connecting the said harvesting mechanism to the chassis and allowing the said harvesting mechanism a heightwise movement with respect to the said chassis, a lightening device associated with the said harvesting mechanism and comprising two elastically deformable members extending transversely to the direction of forward travel during work, each elastically deformable member acting, via a first of its ends, on a corresponding end of the harvesting mechanism via a load-transmission member converting the transverse load created by the said elastically deformable member into an upwardly-directed load at the harvesting mechanism, a centralized device for adjusting the lightening force exerted on the said harvesting mechanism, the said device being coupled to the second ends of the said elastically deformable members.

2. Discussion of the Background

A document, FR 2,110,911, is known in the prior art and describes such a mower which, broadly speaking, comprises a chassis, a connecting means for connecting the said chassis to a motor vehicle, a harvesting mechanism, a suspension device connecting the said harvesting mechanism to the chassis, a device for lightening the said harvesting mechanism and a centralized device for adjusting the lightening force exerted on the said harvesting mechanism.

The lightening device is associated with the harvesting mechanism and comprises a hydraulic ram for acting thereon by means of two cables and elastically deformable members so as to lighten the said harvesting mechanisms by exerting an upwardly-directed load on it. Each cable is actually associated with one elastically deformable member so as firstly, when the hydraulic ram lengthens, to lighten the harvesting mechanism and, secondly, when the said hydraulic ram lengthens further, to raise the said harvesting mechanism.

This known mower does, however, have a certain number of disadvantages.

Specifically, the hydraulic ram is controlled by the hydraulic unit of the motor vehicle, which unit does not allow the said hydraulic ram to be lengthened or shortened with sufficient precision. Furthermore, the slightest leak from the hydraulic ram or from the hydraulic circuit controlling it results in a variation in the length of this ram, and this results in a change of the lightening of the harvesting mechanism.

SUMMARY OF THE INVENTION

The object of the present invention is to overcome these aforementioned drawbacks while at the same time allowing simple, quick and reliable adjustment of the lightening of the cutting mechanism.

To this end, the mower according to the invention is a mower wherein the centralized device for adjusting the lightening force exerted on the harvesting mechanism comprises a rotary control member connected to the chassis and coupled to each second end of the said elastically deformable members via means which convert the rotation of the said rotary control member into an action of stressing or relaxing the said elastically deformable members depending on the direction in which the said rotary control member is turned.

The invention also relates to the following additional features considered in isolation or in any technically feasible combination:

the said means converting the rotation of the rotary control member into an action of stressing or relaxing the elastically deformable members may comprise a rotary control-transmitting spindle fitted between the second ends of the elastically deformable members;

the rotary control-transmitting spindle and the two elastically deformable members may extend at least approximately horizontally;

the rotary control-transmitting spindle and the two elastically deformable members may be at least approximately parallel;

viewed along a longitudinal axis of the rotary control-transmitting spindle, the said longitudinal axis and a longitudinal central axis of each elastically deformable member may be arranged at the three vertices of an at least approximately isosceles triangle;

a longitudinal axis of the rotary control-transmitting spindle and a longitudinal central axis of each elastically deformable member may extend at least approximately in one plane;

the means converting the rotation of the rotary control member into an action of stressing or relaxing the elastically deformable members may additionally comprise at least two cylindrical gear wheels at the second end of at least one of the elastically deformable members;

the means converting the rotation of the rotary control member into an action of stressing or relaxing the elastically deformable members may additionally comprise at least two sprockets and at least one chain at the second end of at least one of the elastically deformable members;

the means converting the rotation of the rotary control member into an action of stressing or relaxing the elastically deformable members may additionally comprise two screw-and-nut connecting members, each connecting the second end of the corresponding elastically deformable member to the chassis;

the said cylindrical gear wheels at the second end of at least one of the elastically deformable members may couple the corresponding screw-and-nut connecting member to the rotary control-transmitting spindle;

the said sprockets and the said chain(s) at the second end of at least one of the elastically deformable members may couple the corresponding screw-and-nut connecting member to the rotary control-transmitting spindle;

at the second end of one of the elastically deformable members there may be two cylindrical gear wheels which couple the corresponding screw-and-nut connecting member to the rotary control-transmitting spindle and at the second end of the other elastically deformable member there may be two sprockets and a chain or three cylindrical gear wheels which couple the corresponding screw-and-nut connecting member to the rotary control-transmitting spindle;

each screw-and-nut connecting member may have a screw member and a nut member, the said screw member or the said nut member being connected to the chassis so that it can only turn;

the screw member may be formed of a threaded rod which is guided in rotation in the chassis without the possibility of translational movement and the nut member may be connected to the second end of the corresponding elastically deformable member;

each elastically deformable member may comprise at least one cylindrical coil spring;

the said cylindrical coil spring(s) may be (a) tension spring(s);

the nut member may be formed of a nut screwed into the end of (one of) the cylindrical coil spring(s) of the corresponding elastically deformable member, the said nut having a threaded hole into which the threaded rod of the corresponding screw member is screwed;

the rotary control member may be connected directly to the rotary control-transmitting spindle;

the rotary control member may have a rotary control spindle which is at least approximately colinear with the rotary control-transmitting spindle;

the rotary control spindle and the rotary control-transmitting spindle may form a single piece;

the rotary control member may have a cranking handle extending to outside the chassis;

the cranking handle may extend at one of the longitudinal ends of the chassis;

the cranking handle may extend, viewed in the direction of forward travel during work, at the left-hand end of the chassis;

each elastically deformable member may act on the harvesting mechanism by means of a rocker arm guided in rotation in the chassis and to which the first end of the said elastically deformable member is connected directly or indirectly, and a linkage extending between the rocker arm and the corresponding end of the harvesting mechanism;

the suspension device connecting the harvesting mechanism to the chassis may comprise, in particular, two lower links each articulated between one end of the harvesting mechanism and the chassis, and each linkage may be articulated to the harvesting mechanism at a point in such a way that the tensile load exerted by the linkages creates, about the articulation about which the lower links are articulated to the harvesting mechanism, a moment which tends to raise the front of the harvesting mechanism;

the chassis may comprise a hollow part extending transversely to the direction of forward travel during work and the elastically deformable members may extend at least approximately entirely inside the said hollow part of the chassis.

BRIEF DESCRIPTION OF THE DRAWINGS

Further objects and features of the invention will emerge from the description hereinafter with reference to the appended drawings which depict, by way of non-limiting example, one embodiment of the mower according to the invention.

In these drawings.

DESCRIPTION OF THE PREFERRED EMBODIMENTS

Figure 1:
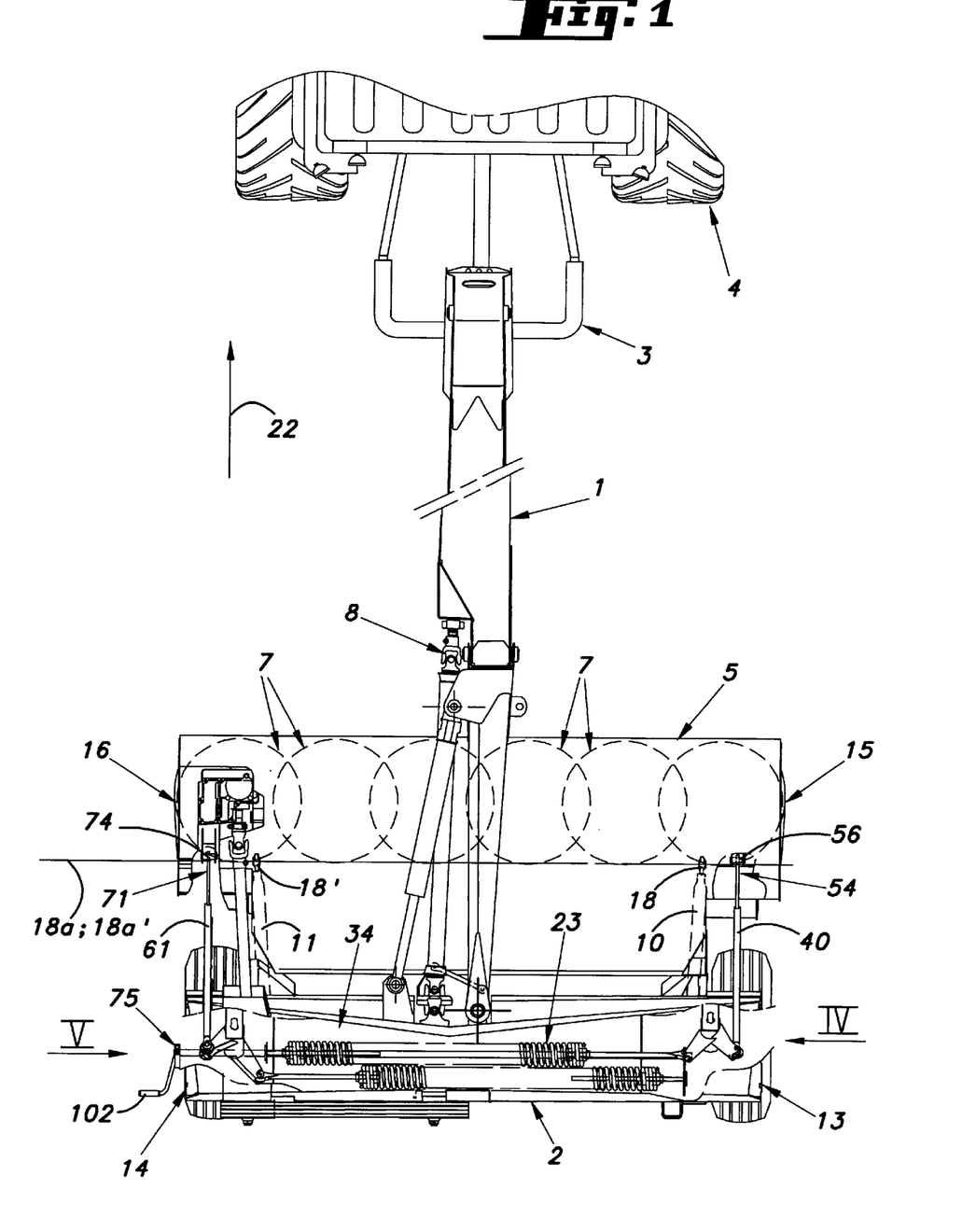
FIG. 1 depicts a view from above, partly in section, of a mower according to the invention in a transport position.
Figure 2:
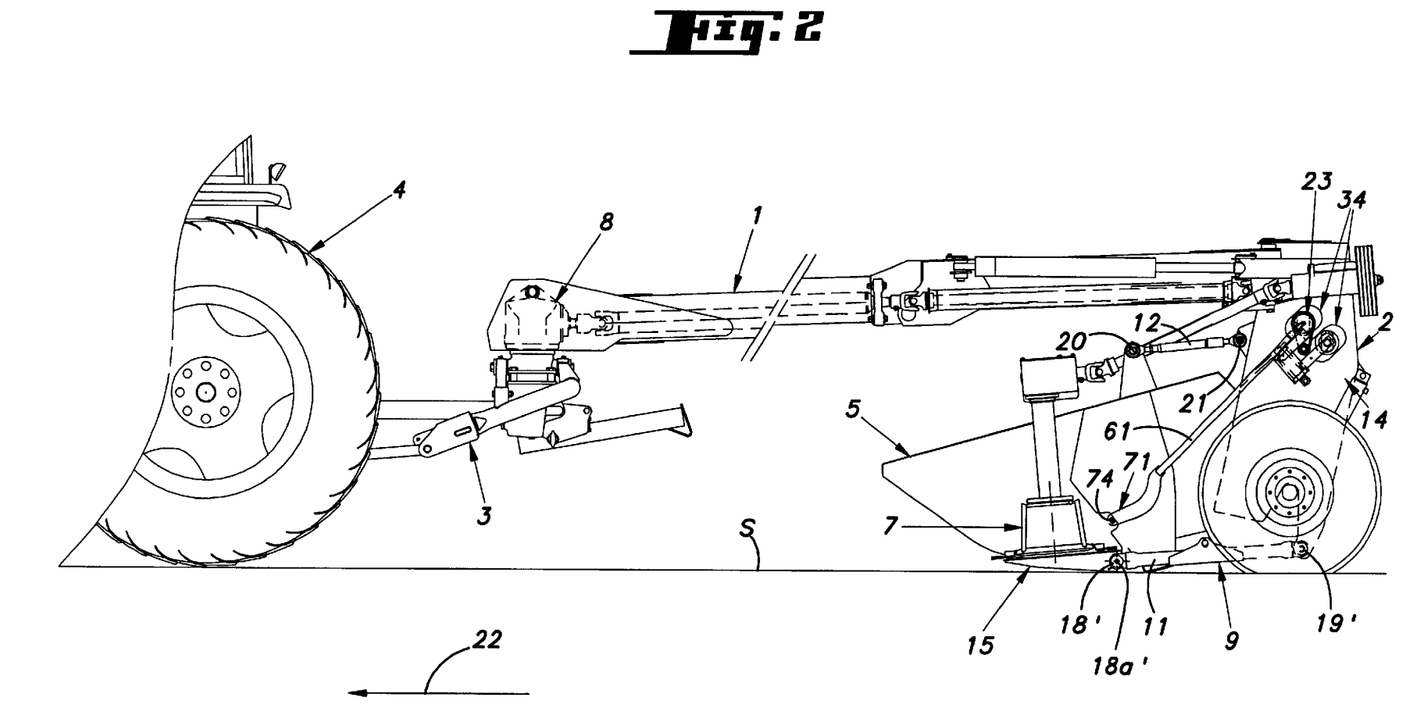
FIG. 2 depicts a side view, partly in section, of the mower of FIG. 1.

FIGS. 1 and 2 show a mower 1 comprising, broadly speaking, a chassis 2, a connecting means 3 connecting the said chassis 2 to a motor vehicle 4, and a harvesting mechanism 5. This harvesting mechanism 5 comprises cutting members 7 which are intended to be driven in a rotational movement by means of transmission members 8. This harvesting mechanism 5 is connected to the chassis 2 by means of a suspension device 9 allowing heightwise movement of the said harvesting mechanism 5 with respect to the said chassis 2. For this purpose, the suspension device 9 includes, according to the embodiment depicted, a first lower link 10, a second lower link 11 and a top link 12.

Each lower link 10, 11 is located relatively close to the ground S and near to a corresponding lateral end 13, 14 of the chassis 2. Each lower link 10, 11 is articulated between a corresponding lateral end 15, 16 of the harvesting mechanism 5 and the corresponding lateral end 13, 14 of the chassis 2. For this purpose, each lower link 10, 11 is connected, on the one hand, to the harvesting mechanism 5 by means of a first articulation 18, 18' with longitudinal axis 18a, 18a' and, on the other hand, to the chassis 2 by means of a second articulation 19, 19'. It will be noted that, when viewed from above, as depicted in FIG. 1, the longitudinal axes 18a, 18a' are at least approximately coincident and extend approximately horizontally and orthogonally to the direction of forward travel 22.

The top link 12 for its part is articulated between one 16 of the lateral ends 15, 16 of the harvesting mechanism 5 and the corresponding lateral end 14 of the chassis 2. For this purpose, the top link 12 is connected, on the one hand, to the harvesting mechanism 5 by means of a third articulation 20 and, on the other hand, to the chassis 2 by means of a fourth articulation 21.

In the remainder of the description, the ideas of "front", "rear", "in front of" and "to the rear of" are defined with respect to the direction of forward travel during work 22, indicated by the direction of forward travel during work arrow 22, and the ideas of "right" and "left" are defined by looking at the mower 1 from behind, in the direction of forward travel during work 22.

Figure 3:
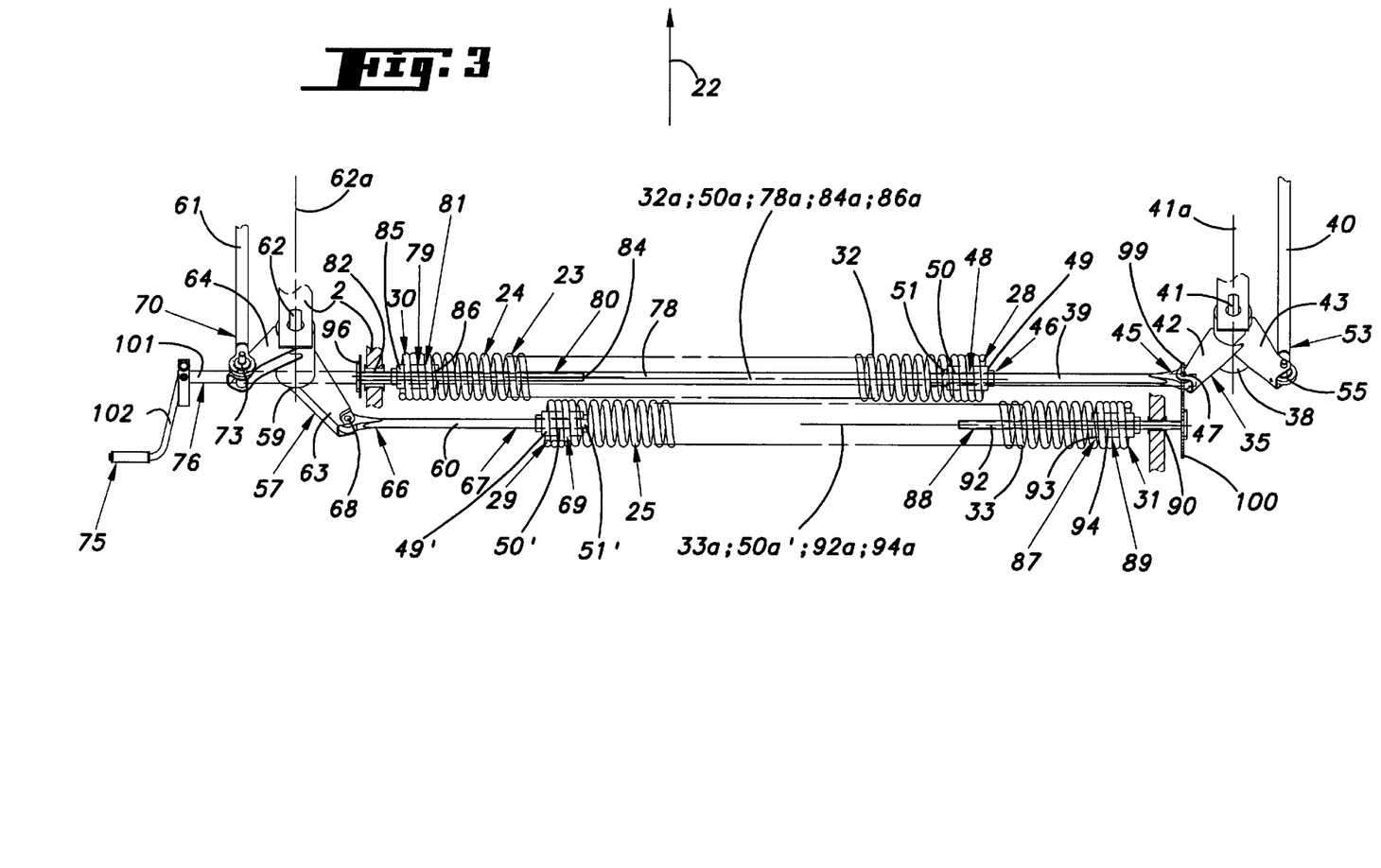
FIG. 3 depicts, viewed from above, the lightening device and the centralized device for adjusting the lightening force exerted on the harvesting mechanism of the mower of FIG. 1.
Figure 4:
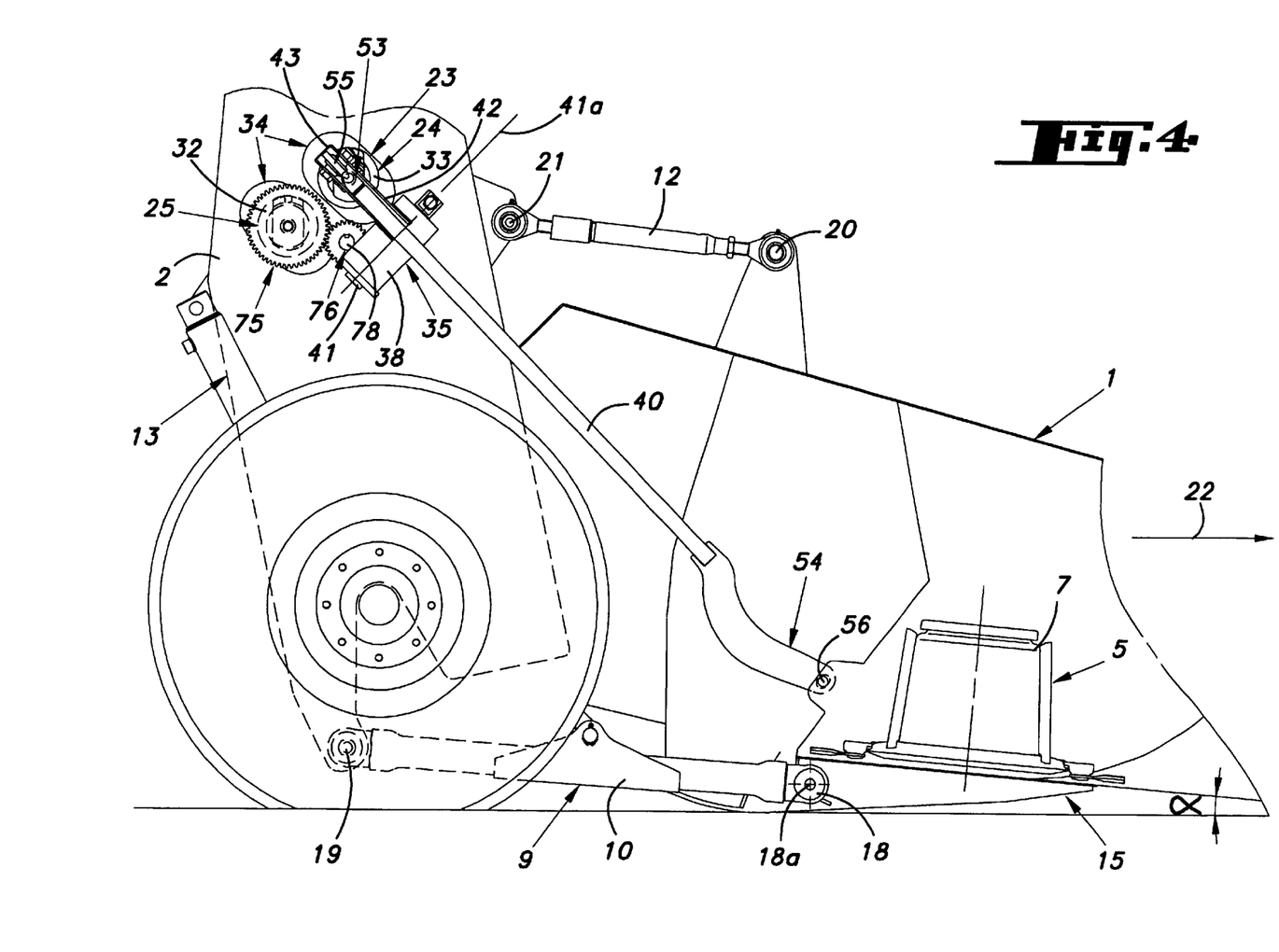
FIG. 4 depicts, to a different scale, part of the mower viewed in the direction of arrow IV depicted in FIG. 1.
Figure 5:
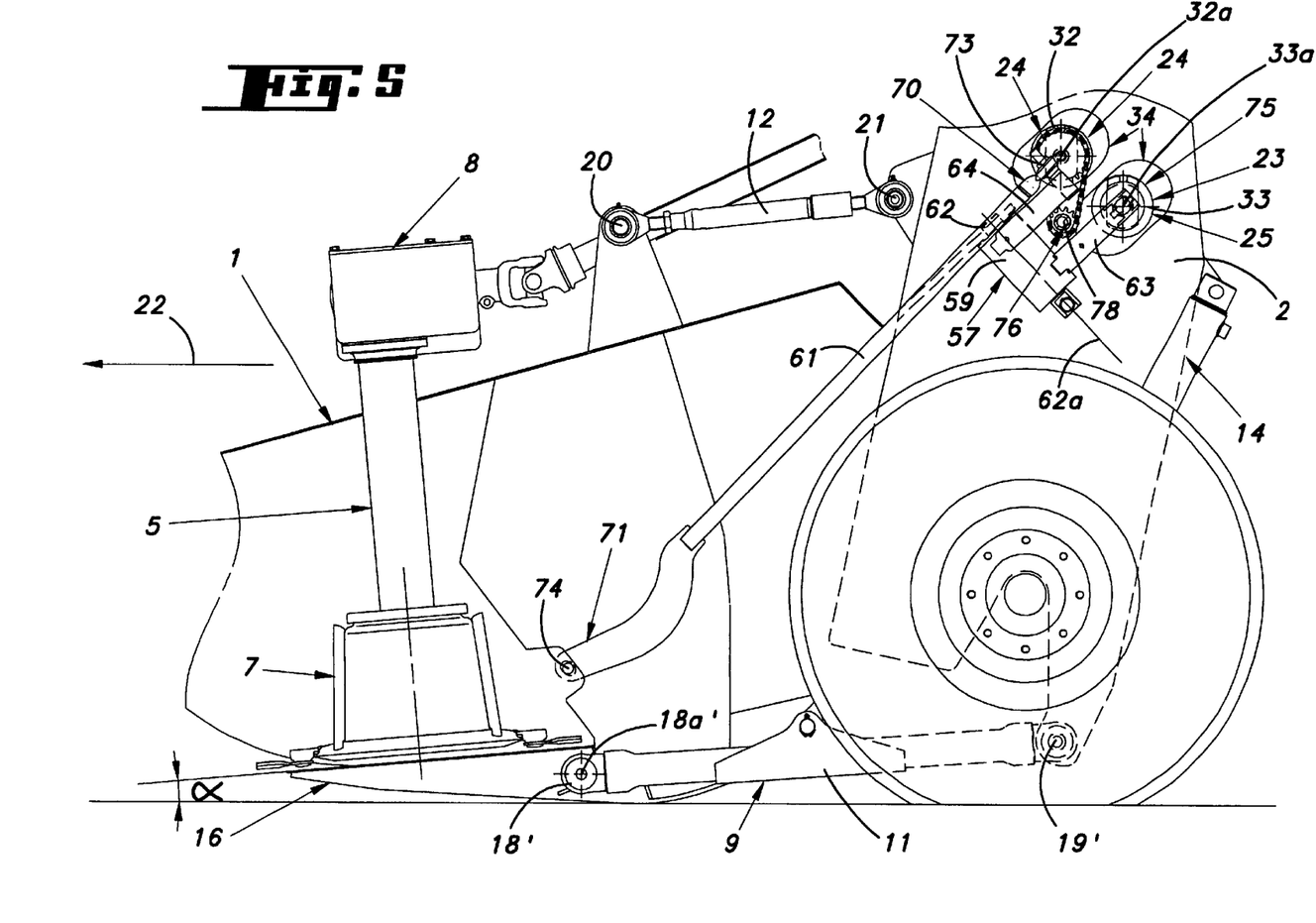
FIG. 5 depicts, to a different scale, part of the mower viewed in the direction of arrow V depicted in FIG. 1.

The mower 1 according to the present invention additionally comprises a lightening device 23 which is associated with the harvesting mechanism 5. In the light of FIGS. 3 to 5, it can be seen that this lightening device 23 comprises a first elastically deformable member 24 and a second elastically deformable member 25 extending transversely to the direction of forward travel during work 22. Each of the said elastically deformable members 24, 25 has a first end 28, 29 and a second end 30, 31.

In the light of FIG. 3, it can be seen more specifically that each elastically deformable member 24, 25 comprises a cylindrical coil spring which, according to the embodiment depicted, is a tension spring 32, 33 of longitudinal axis 32a, 33a.

These two tension springs 32, 33 extend approximately horizontally and orthogonally to the direction of forward travel during work 22. For this purpose, the chassis 2 comprises a hollow part 34 extending transversely to the direction of forward travel during work 22 and inside which the two tension springs 32, 33 extend.

Such a layout of the said tension springs 32, 33 advantageously makes it possible not to block the suspension device 9 and to have a mower 1 that is more compact, particularly as regards its overall width, which is important for transport by road. Furthermore, as the tension springs 32, 33 extend inside the hollow part 34 of the chassis 2, they do not require any special-purpose covers often required for compliance with safety regulations.

It will also be noted that each tension spring 32, 33 acts, via its first end 28, 29, on the corresponding lateral end 15, 16 of the harvesting mechanism 5.

It will thus be seen in FIG. 3 that the first end 28 of the first tension spring 32 is connected to a first load-transmitting member 35 which converts the transverse load created by the said first tension spring 32 into an upwards directed load at the right-hand end 15 of the harvesting mechanism 5. For this purpose, the first load-transmitting member 35 comprises, according to the embodiment depicted, a first rocker arm 38, a first bar 39 and a first linkage 40. This first rocker arm 38 is guided in rotation in the chassis 2 by means of a fifth articulation 41 the longitudinal axis 41a of which is directed forwards and upwards (FIG. 4).

This first rocker arm 38 has a first arm 42 and a second arm 43. This first arm 42 extends, in the work position, backwards and upwards and to the left, whereas the second arm 43 of the first rocker arm 38 extends, in the work position, backwards and upwards and to the right. When viewed along the longitudinal axis 41a of the fifth articulation 41, these two arms 42, 43 of the first rocker arm 38 make an acute angle with one another. It will also be noted that the second arm 43, when viewed from the side as depicted in FIG. 4, is approximately coincident with the first arm 42. Finally, it will also be noted that in the normal work position, the two arms 42, 43 of the first rocker arm 38 extend, when viewed along the longitudinal axis 41a of the fifth articulation 41, approximately symmetrically with respect to a vertical plane extending in the direction of work 22 and containing the said longitudinal axis 41a.

One 45 of the ends 45, 46 of the first bar 39 is connected to the said first arm 42 by means of a sixth articulation 47 of the spherical joint type in the example depicted, while the other end 46 of the first bar 39 is connected to the first end 28 of the first tension spring 32 by means of a first sliding connection 48. This first sliding connection 48 comprises, according to the embodiment depicted, a first nut 49 screwed into the first end 28 of the first tension spring 32, the said first nut 49 itself having a hole 50 the longitudinal axis 50a of which is approximately coincident with the longitudinal axis 32a of the first tension spring 32. The other end 46 of the first bar 39 extends through this hole 50 so as to allow relative movement between the first tension spring 32 and the said first bar 39. It will, however, be noted that there is a first stop 51 at the other end 46 of the first bar 39 which comes to rest against the first nut 49 so that the first tension spring 32 can act on the first load-transmitting member 35.

One 53 of the ends 53, 54 of the first linkage 40 is connected to the second arm 43 by means of a seventh articulation 55 of the spherical joint type, in the example depicted, while the other end 54 of the said first linkage 40 is connected to the corresponding lateral end 15 of the harvesting mechanism 5 by means of an eighth articulation 56 which is also of the spherical joint type in the example depicted.

This eighth articulation 56 is located in such a way that the tensile load exerted by the first linkage 40 creates, on the corresponding lateral end 15 of the harvesting mechanism 5, a moment about the articulation 18 of the first lower link 10 which tends to raise the front of the said harvesting mechanism 5. Specifically, in the light of FIG. 4, it can be seen that the eighth articulation 56 connecting the first linkage 40 to the harvesting mechanism 5 is located higher up than the corresponding first articulation 18 and somewhat in front of it.

In the light of FIG. 3, it can also be seen that the first end 29 of the second tension spring 33 is connected to a second load-transmitting member 57 which converts the transverse load created by the said second tension spring 33 into an upwardly-directed load at the left-hand end 16 of the harvesting mechanism 5. For this purpose, the second load-transmitting member 57 comprises, in the embodiment depicted, a second rocker arm 59, a second bar 60 and a second linkage 61. This second rocker arm 59 is guided in rotation in the chassis 2 by means of a ninth articulation 62, the longitudinal axis 62a of which is directed forwards and upwards (FIG. 5). In the example depicted, the longitudinal axis 62a of the ninth articulation 62 and the longitudinal axis 41a of the fifth articulation 41 extend approximately in one and the same common plane. Furthermore, in the example depicted, the second rocker arm 59 extends, when viewed from the side in the direction of the arrow V (FIG. 1), at the same level, in the common plane, as the first rocker arm 38.

This second rocker arm 59 also has a first arm 63 and a second arm 64. This first arm 63 extends, in the work position, backwards and upwards and to the right, while the second arm 64 of the second rocker arm 59 extends, in the work position, backwards and upwards and to the left. When viewed along the longitudinal axis 62a of the ninth articulation 62, these two arms 63, 64 of the second rocker arm 59 also form an acute angle with one another. In the example depicted, the angle between the two arms 63, 64 of the second rocker arm 59 is approximately equal to the angle between the two arms 42, 43 of the first rocker arm 38. It will also be noted that the second arm 64 is located in front of the first arm 62 as depicted in FIG. 5. It will further be noted that the second arms 43, 64 of the two rocker arms 38, 59 are approximately the same length, while the length of the first arm 63 of the second rocker arm 59 is somewhat longer than that of the first arm 42 of the first rocker arm 38 given that the left-hand end 16 of the harvesting mechanism 5 is a little heavier than its right-hand end 15. Finally, it will also be noted that, in the normal work position, the two arms 63, 64 of the second rocker arm 59 extend, when viewed along the longitudinal axis 62a of the ninth articulation 62, approximately symmetrically with respect to a vertical plane extending in the direction of work 22 and containing the said longitudinal axis 62a.

One 66 of the ends 66, 67 of the second bar 60 is connected to the first arm 63 by means of a tenth articulation 68 of the spherical joint type in the example depicted, while the other end 67 of the said second bar 60 is connected to the first end 29 of the second tension spring 33 by means of a second sliding connection 69. This second sliding connection 69 also, according to the embodiment depicted, comprises a second nut 49' screwed into the first end 29 of the second tension spring 33, the said second nut 49' itself having a hole 50' the longitudinal axis 50a' of which is approximately coincident with the longitudinal axis 33a of the second tension spring 33. The other end 67 of the second bar 60 extends through this hole 50' so as to allow relative movement between the second tension spring 33 and the said second bar 60. It will also be noted that there is also a second stop 51' at the other end 67 of the second bar 60 which stop comes to bear against the second nut 49' in such a way that the second tension spring 33 can act on the second load-transmitting member 57.

One 70 of the ends 70, 71 of the second linkage 61 is connected to the second arm 64 by means of an eleventh articulation 73 of the spherical joint type in the example depicted, while the other end 71 of the said second linkage 61 is connected to the corresponding lateral end 16 of the harvesting mechanism 5 by means of a twelfth articulation 74, also of the spherical joint type in the example depicted.

This twelfth articulation 74 is also located in such a way that the tensile load exerted via the second linkage 61 creates, on the corresponding lateral end 16 of the harvesting mechanism 5, a moment about the articulation 18 of the second lower link 11 which tends to raise the front of the harvesting mechanism 5. Specifically, in the light of FIG. 5, it can be seen that the twelfth articulation 74 is located higher up than the corresponding first articulation 18' and somewhat in front of it.

In the light of FIG. 1, it can also be seen that the longitudinal axes 18a, 18a' of the two first articulations 18, 18' are at least approximately coincident.

Such an arrangement of the two first articulations 18, 18', of the eighth articulation 56 and of the twelfth articulation 74, combined with the lightening force developed by the tension springs 32, 33 of the lightening device 23 advantageously allows the top link 12 to be less heavily stressed and this makes the length of this link easier to adjust. Thus, the angle of attack of the harvesting mechanism 5 (angle α) can easily be changed irrespective of the position of the said harvesting mechanism 5.

This mower 1 according to the present invention additionally comprises a centralized device 75 for adjusting the lightening force exerted on the harvesting mechanism 5.

This centralized adjusting device 75 is coupled to the two second ends 30, 31 of the two elastically deformable members 24, 25. For this purpose, the centralized device 75 for adjusting the lightening force exerted on the harvesting mechanism 5 comprises a rotary control member 76 connected to the chassis 2 and coupled to each second end 30, 31 of the elastically deformable members 24, 25 via means which convert the rotation of the said rotary control member 76 into an action of stressing or relaxing the said elastically deformable members 24, 25, depending on the direction in which the said rotary control member 76 is turned.

In the light of FIG. 3 in particular, it can be seen that the means which convert the rotation of the rotary control member 76 into an action of stressing or relaxing the elastically deformable members 24, 25 comprise a rotary control-transmitting spindle 78. It will be noted that the second end 30 of the first elastically deformable member 24 is located near the lateral end 14 of the chassis 2, while the second end 31 of the second elastically deformable member 25 is located near the lateral end 13 of the said chassis 2. The rotary control-transmitting spindle 78 is fitted between the second ends 30, 31 of the elastically deformable members 24, 25 and therefore extends over approximately the entire length of the chassis 2 from one lateral end 13 to the other lateral end 14 thereof. It will also be noted that this rotary control-transmitting spindle 78 also extends approximately horizontally and parallel to the two elastically deformable members 24, 25.

Figures 6, 8:
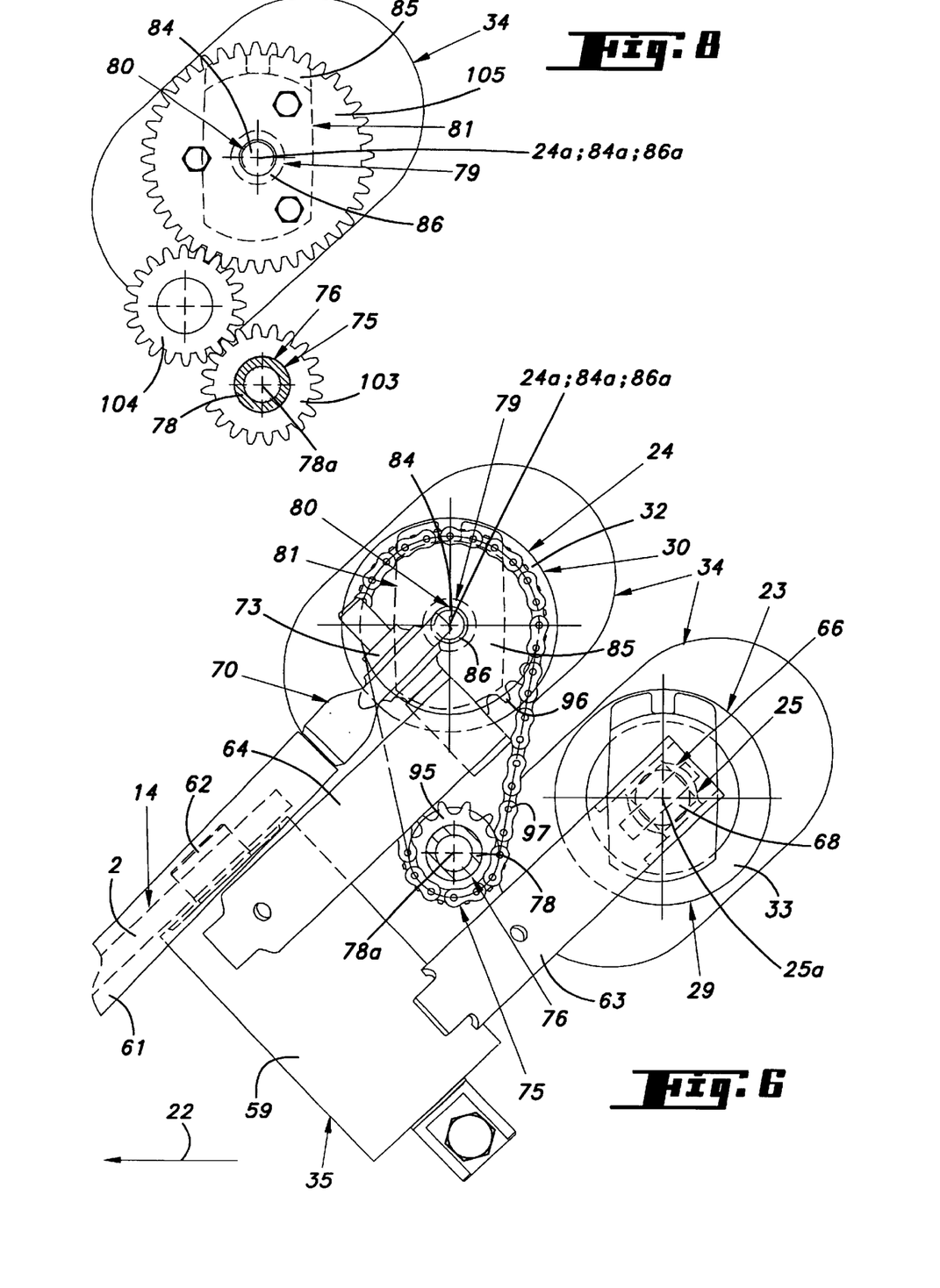
FIG. 6 depicts, to a different scale, part of the lightening device and of the centralized device for adjusting the lightening force as depicted in FIG. 4.
FIG. 8 depicts another embodiment of the centralized device for adjusting the lightening force.
Figure 7:
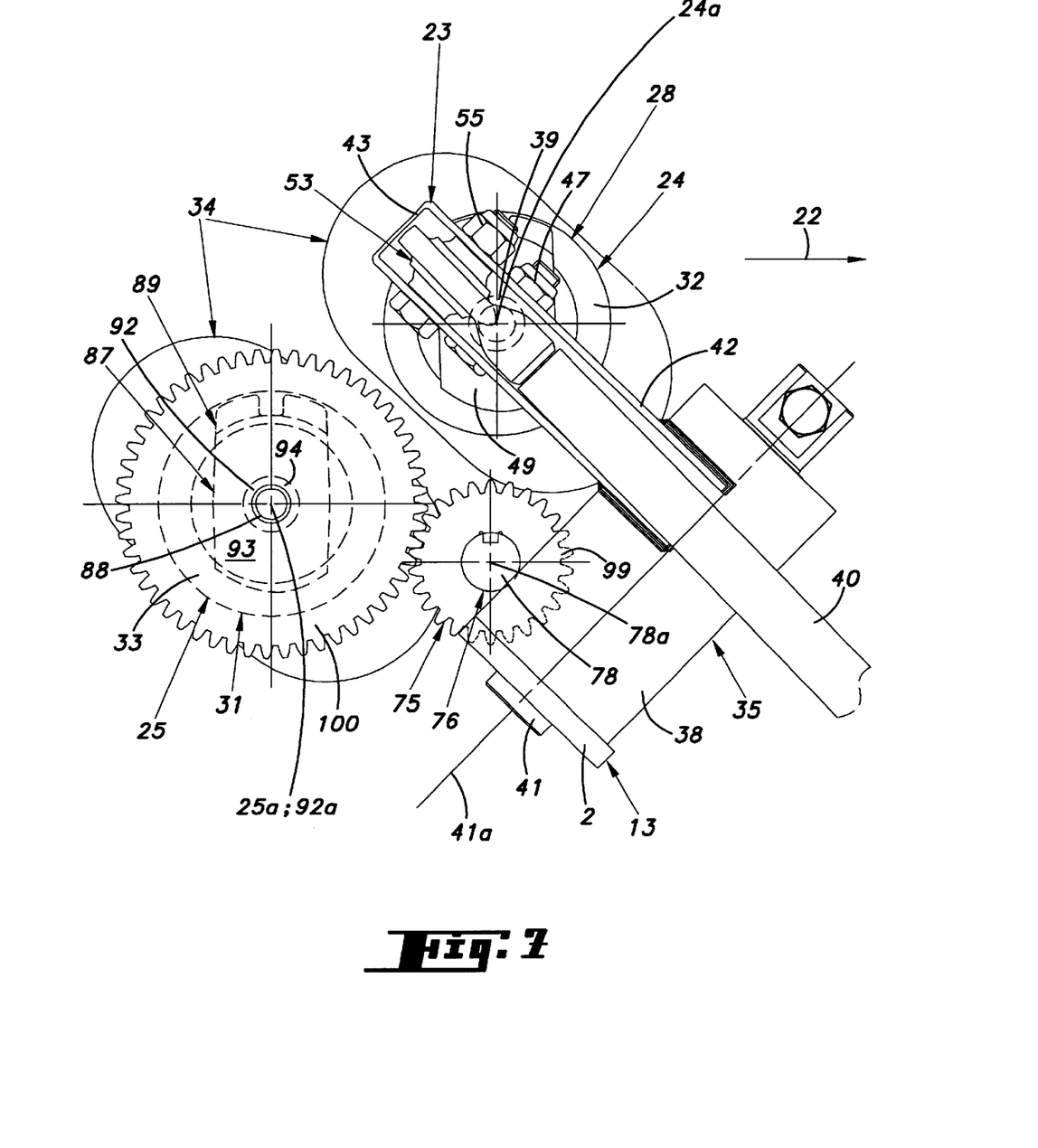
FIG. 7 depicts, to a different scale, part of the lightening device and of the centralized device for adjusting the lightening force as depicted in FIG. 5.

In the light of FIGS. 6 and 7 it can additionally be seen that a longitudinal axis 78a of the rotary control-transmitting spindle 78 and the two central longitudinal axes 24a, 25a of the elastically deformable members 24, 25 are arranged at the three vertices of an at least approximately isosceles triangle. In other words, the distance separating the longitudinal axis 78a of the rotary control-transmitting spindle 78 from each central longitudinal axis 24a, 25a of the elastically deformable members 24, 25 is at least approximately equal.

In another solution, this longitudinal axis 78a of the rotary control-transmitting spindle 78 and the central longitudinal axis 24a, 25a of each elastically deformable member 24, 25 may extend at least approximately in one plane.

In the light of the various figures, it can be seen that the means converting the rotation of the rotary control member 76 into an action of stressing or relaxing the elastically deformable members 24, 25 additionally comprise a first screw-and-nut connecting member 79 connecting the second end 30 of the first elastically deformable member 24 to the chassis 2. This first screw-and-nut connecting member 79 itself comprises a first screw member 80 and a first nut member 81.

In the light of FIG. 3, it can be seen that the first screw member 80 is formed of a first threaded rod 84 which is guided in rotation in the chassis 2 by means of a first connection of the pivot type 82 so that it can only turn. The first nut member 81 is, for its part, connected to the second end 30 of the first elastically deformable member 24. More specifically, it will be noted that the first nut member 81 is formed of a third nut 85 screwed into the second end 30 of the first tension spring 32. This third nut 85 has, at its centre, a first threaded hole 86, the longitudinal axis 86a of which is at least approximately coincident with the longitudinal axis 32a of the first tension spring 32. The first threaded rod 84 is screwed into this first threaded hole 86.

The means converting the rotation of the rotary control member 76 into an action of stressing or relaxing the elastically deformable members 24, 25 also comprises a second screw-and-nut connecting member 87 connecting the second end 31 of the second elastically deformable member 25 to the chassis 2. This second screw-and-nut connecting member 87 itself comprises a second screw member 88 and a second nut member 89.

In the light of FIG. 3, it can be seen that the second screw member 88 is formed of a second threaded rod 92 which is guided in rotation in the chassis 2 by means of a second connection of the pivot type 90 so that it can only turn. The second nut member 89 is, for its part, connected to the second end 31 of the second elastically deformable member 25. It will be noted that the second nut member 89 is formed of a fourth nut 93 screwed into the second end 31 of the second tension spring 33. This fourth nut 93 has, at its centre, a second threaded hole 94 the longitudinal axis 94a of which is at least approximately coincident with the longitudinal axis 33a of the second tension spring 33. The second threaded rod 92 is screwed into this second threaded hole 94.

It will be noted that, in the embodiment depicted, the threading of the threaded rods 84, 92 and of the threaded holes 86, 94 of the corresponding nuts 85, 93 are right-hand threadings.

The means converting the rotation of the rotary control member 76 into an action of stressing or relaxing the elastically deformable members 24, 25 additionally comprise a first sprocket 95, a second sprocket 96 and a chain 97 connecting these sprockets together in such a way as to enable the rotational movement to be transmitted from one of the sprockets 95, 96 to the other of the said sprockets 95, 96.

In the light of FIGS. 3 and 6 in particular, it can more precisely be seen that the two sprockets 95, 96 and the chain 97 are located at the second end 30 of the first elastically deformable member 24.

These two sprockets 95, 96 and the chain 97 allow the first screw-and-nut connecting member 79 to be coupled to the rotary control-transmitting spindle 78. For this purpose, the first sprocket 95 is fixed to the rotary control-transmitting spindle 78 and the second sprocket 96 is fixed to the first threaded rod 84. It will be noted that the first sprocket 95 is advantageously smaller in terms of its diameter than the second sprocket 96 and that the said first sprocket 95 is located approximately vertically below the said second sprocket 96.

In the light of FIGS. 3 and 7 in particular, it can be seen that the means converting the rotation of the rotary control member 76 into an action of stressing or relaxing the elastically deformable members 24, 25 further comprise a first cylindrical gear wheel 99 and a second cylindrical gear wheel 100. These two cylindrical gear wheels 99, 100 are, for their part, located at the second end 31 of the second elastically deformable member 25. These two cylindrical gear wheels 99, 100 couple the second screw-and-nut connecting member 87 to the rotary control-transmitting spindle 78. For this purpose, it can be seen, in the light of FIG. 7, that the second cylindrical gear wheel 100 meshes with the first cylindrical gear wheel 99 so as to enable the rotational movement to be transmitted from one of the said cylindrical gear wheels 99, 100 to the other of the said cylindrical gear wheels 99, 100. To do this, the first cylindrical gear wheel 99 is fixed to the rotary control-transmitting spindle 78 and the second cylindrical gear wheel 100 is fixed to the second threaded rod 92. It will be noted that the first cylindrical gear wheel 99 is also advantageously smaller in terms of its diameter than the second cylindrical gear wheel 100 and that the said second cylindrical gear wheel 100 is located to the rear of the said first cylindrical gear wheel 99.

In the light of FIG. 3, it can be seen that the rotary control member 76 is connected directly to the rotary control-transmitting spindle 78 and has a rotary control spindle 101 which is at least approximately colinear with the said rotary control-transmitting spindle 78. More specifically, it will be noted that the rotary control spindle 101 and the rotary control-transmitting spindle 78 in fact form a single piece. The rotary control member 76 also has a cranking handle 102 extending at the left-hand lateral end 14 of the chassis 2, and to the outside of this chassis so as to allow the operator quick and easy access to the said cranking handle 102 for adjusting the centralized adjustment device 75 of the mower 1. This cranking handle 102 may advantageously be folded down once the lightening has been adjusted, so as to prevent it from protruding beyond the overall width of the mower 1. There is thus no risk that it will become caught up or injure somebody while the mower 1 is in use.

This centralized device 75 for adjusting the lightening force exerted on the harvesting mechanism 5 works as follows.

When the operator wishes to change the lightening force exerted on the harvesting mechanism 5 he operates the cranking handle 102. By turning the cranking handle 102 in the clockwise direction (taking reference to the operator performing the adjustment), the rotary control-transmitting spindle 78 is rotated, and this allows the first threaded rod 84 and the second threaded rod 92 to be made to rotate. In effect, as the rotary control-transmitting spindle 78 is rotated in the clockwise direction, the first sprocket 95 which is fixed to the said rotary control-transmitting spindle 78 is able, via the chain 97, to drive the second sprocket 96 which is fixed to the first threaded rod 84 in the same direction of rotation.

During this rotation of the rotary control-transmitting spindle 78, the first cylindrical gear wheel 99 is driven in the same direction as the first sprocket 95, and via the second cylindrical gear wheel 100 enables the second threaded rod 92 to be driven in the opposite direction to the direction of the said first cylindrical gear wheel 99.

When the first threaded rod 84 rotates in the clockwise direction, the third nut 85 is moved to the left, this making it possible to increase the stress in the first tension spring 32, this spring acting on the first bar 39 which itself acts on the first linkage 40 via the first rocker arm 38 so that the said first linkage 40 creates an increased lightening force on the right-hand lateral end 15 of the harvesting mechanism 5. At the same time, the second threaded rod 92 rotates in the opposite direction to the direction of the first threaded rod 84 so that the fourth nut 93 is moved to the right, this making it possible to increase the stress in the second tension spring 33 which acts on the second bar 60 which itself acts on the second linkage 61 via the second rocker arm 59 so that the said second linkage 61 also creates an increased lightening force on the left-hand lateral end 16 of the harvesting mechanism 5.

By turning the cranking handle 102 in the anticlockwise direction, it is the opposite effect which is obtained, the stress in the two tension springs 32, 33 decreases, and this results in a reduction in the lightening force exerted on the harvesting mechanism 5.

Various modifications may be made to the example which has just been described, particularly as regards the construction of the various elements, by substituting technical equivalents without in any way departing from the field of protection defined by the claims.

Thus, for example, it is perfectly possible to envisage for the cranking handle 102 to be mounted on the first threaded rod 84 or the second threaded rod 92. It then being possible for the threaded rod 84, 92 to be lengthened until it extends outside the chassis 2.

To make it easier to adjust the lightening force exerted on the harvesting mechanism 5 it is also perfectly possible to replace the cranking handle 102 with a motor of the hydraulic or electric type for example. Such a motor would allow the operator to change the lightening force exerted on the harvesting mechanism 5 during work without having to get down from the driving-position of the motor vehicle 4.

It is also perfectly possible, for example, to envisage for the first threaded rod 84 and the first threaded hole 86 of the third nut 85 to comprise a right-hand threading while the second threaded rod 92 and the second threaded hole 94 of the fourth nut 93 have a left-hand threading, which would thus make it possible to have both threaded rods 84, 92 rotating in the same direction.

Finally, it is also possible to replace the tension springs 32, 33 with torsion bars, for example, controlled by means which convert the rotation of the control member 76 into an action of stressing or relaxing the said torsion bars.

It is also perfectly possible to replace the first sprocket 95, the second sprocket 96 and the chain 97 with three cylindrical gear wheels 103, 104, 105 which mesh together in such a way that the first threaded rod takes the same direction of rotation as the rotary control-transmitting spindle 78.

It will furthermore be understood that the cranking handle 102 could extend out from the right-hand lateral end 13 of the chassis 2.

It will finally be understood that the tension springs 32, 33 could also extend outside the chassis 2.

What is claimed as new and desired to be secured by Letters Patent of the United States is:

1. Mower comprising:
   a chassis,
   a connecting means allowing the chassis to be connected to a motor vehicle,
   at least one harvesting mechanism equipped with cutting members,
   a suspension device connecting the harvesting mechanism to the chassis and allowing said harvesting mechanism a heightwise movement with respect to said chassis,
   a lightening device associated with the harvesting mechanism and comprising two elastically deformable members extending transversely to a direction of forward travel during work, each elastically deformable member acting, via a first of its ends, on a corresponding end of the harvesting mechanism via a load-transmission member converting a transverse load created by said elastically deformable member into an upwardly-directed load at the harvesting mechanism,
   a centralized device for adjusting the lightening force exerted on the harvesting mechanism, said device being coupled to a second end of each elastically deformable member,
   wherein the centralized device for adjusting the lightening force exerted on the harvesting mechanism comprises a rotary control member connected to the chassis and coupled to each second end of the elastically deformable members via means which convert a rotation of said rotary control member into an action of stressing or relaxing said elastically deformable members depending on a direction in which said rotary control member is turned.

2. Mower according to claim 1, wherein the means converting the rotation of the rotary control member into an action of stressing or relaxing the elastically deformable members comprise a rotary control-transmitting spindle fitted between the second ends of eh elastically deformable members.

3. Mower according to claim 2, wherein the rotary control-transmitting spindle and the two elastically deformable members extend at least approximately horizontally.

4. Mower according to claim 3, wherein the rotary control-transmitting spindle and the two elastically deformable members are at least approximately parallel.

5. Mower according to claim 4, wherein, viewed along a longitudinal axis of the rotary control-transmitting spindle, said longitudinal axis and a longitudinal central axis of each elastically deformable member are arranged at three vertices of an at least approximately isosceles triangle.

6. Mower according to claim 4, wherein a longitudinal axis of the rotary control-transmitting spindle and a longitudinal central axis of each elastically deformable member extend at least approximately in one plane.

7. Mower according to claim 2, wherein the means converting the rotation of the rotary control member into an action of stressing or relaxing the elastically deformable members additionally comprise at least two cylindrical gear wheels at the second end of at least one of the elastically deformable members.

8. Mower according to claim 2, wherein the means converting the rotation of the rotary control member into an action of stressing or relaxing the elastically deformable members additionally comprise at least two sprockets and at least one chain at the second end of at least one of the elastically deformable members.

9. Mower according to claim 2, wherein the means converting the rotation of the rotary control member into an action of stressing or relaxing the elastically deformable members additionally comprise two screw-and-nut connecting members, each connecting the second end of the corresponding elastically deformable member to the chassis.

10. Mower according to claim 9, wherein the means converting the rotation of the rotary control member into an action of stressing or relaxing the elastically deformable members additionally comprise at least two cylindrical gear wheels at the second end of at least one of the elastically deformable members, said cylindrical gear wheels at the second end of at least one of the elastically deformable members couple a corresponding screw-and-nut connecting, member to the rotary control-transmitting spindle.

11. Mower according to claim 9, wherein the means converting the rotation of the rotary control member into an action of stressing or relaxing the elastically deformable members additionally comprise at least two sprockets and at least one chain at the second end of at least one of the elastically deformable members, said sprockets and the at least one chain at the second end of at least one of the elastically deformable members couple a corresponding screw-and-nut connecting member to the rotary control-transmitting spindle.

12. Mower according to claim 11, wherein:
   the cylindrical gear wheels at the second end of at least one of the elastically deformable members couple the corresponding screw-and-nut connecting member to the rotary control-transmitting spindle;
   at the second end of one of the elastically deformable members there are two cylindrical gear wheels which couple the corresponding screw-and-nut connecting member to the rotary control-transmitting spindle;
   at the second end of the other elastically deformable member there are two sprockets and a chain or three cylindrical gear wheels which couple the corresponding screw-and-nut connecting member to the rotary control-transmitting spindle.

13. Mower according to claim 9, wherein each screw-and-nut connecting member has a screw member and a nut member, said screw member or said nut member being connected to the chassis so that it can only turn.

14. Mower according to claim 13, wherein:
   the screw member is formed of a threaded rod which is guided in rotation in the chassis without the possibility of translational movement, the nut member is connected to the second end of the corresponding elastically deformable member.

15. Mower according to claim 1, wherein each elastically deformable member comprises at least one cylindrical coil spring.

16. Mower according to claim 15, wherein the at least one cylindrical coil spring is tension spring.

17. Mower according to claim 14, wherein each elastically deformable member comprises at least one cylindrical coil spring, and the nut member is formed of a nut screwed into an end of the at least one cylindrical coil spring of the corresponding elastically deformable member, said nut having a threaded hole into which the threaded rod of the corresponding screw member is screwed.

18. Mower according to claim 2, wherein the rotary control member is connected directly to the rotary control-transmitting spindle.

19. Mower according to claim 18, wherein the rotary control member has a rotary control spindle which is at least approximately colinear with the rotary control-transmitting spindle.

20. Mower according to claim 19, wherein the rotary control spindle and the rotary control-transmitting spindle form a single piece.

21. Mower according to claim 1, wherein the rotary control member has a cranking handle extending to outside the chassis.

22. Mower according to claim 21, wherein the cranking handle extends at one of the longitudinal ends of the chassis.

23. Mower according to claim 22, wherein the cranking handle extends, viewed in the direction of forward travel during work, at the left-hand end of the chassis.

24. Mower according to claim 1, wherein each elastically deformable member acts on the harvesting mechanism by means of:
- a rocker arm guided in rotation in the chassis and to which the first end of the said elastically deformable member is connected directly or indirectly,
- a linkage extending between the rocker arm and the corresponding end of the harvesting mechanism.

25. Mower according to claim 24, wherein:
- the suspension device connecting the harvesting mechanism to the chassis comprises, in particular, two lower links each articulated between one end of the harvesting mechanism and the chassis;
- each linkage is articulated to the harvesting mechanism at a point in such a way that a tensile load exerted by the linkages creates, about an articulation about which the lower links are articulated to the harvesting mechanism, a moment which tends to raise a front of the harvesting mechanism.

26. Mower according to claim 1, wherein:
- the chassis comprises a hollow part extending transversely to the direction of forward travel during work;
- the elastically deformable members extend at least approximately entirely inside said hollow part of the chassis.

* * * * *